(12) United States Patent
Sherman et al.

(10) Patent No.: US 9,693,658 B2
(45) Date of Patent: Jul. 4, 2017

(54) DEVICE AND INDUSTRIAL PACKAGE FOR STORING, MEASURING AND DISPENSING POWDER AND GRANULAR SUBSTANCES

(71) Applicants: Yury Sherman, Roslindale, MA (US); Michael Sherman, Newton, MA (US); Ilya Alexandrov, Natick, MA (US); Ramkumar Krishnan, Watertown, MA (US)

(72) Inventors: Yury Sherman, Roslindale, MA (US); Michael Sherman, Newton, MA (US); Ilya Alexandrov, Natick, MA (US); Ramkumar Krishnan, Watertown, MA (US)

( * ) Notice: Subject to any disclaimer, the term of this patent is extended or adjusted under 35 U.S.C. 154(b) by 0 days.

(21) Appl. No.: 14/740,263

(22) Filed: Jun. 16, 2015

(65) Prior Publication Data

US 2016/0367054 A1 Dec. 22, 2016

(51) Int. Cl.

| | |
|---|---|
| *G01F 13/00* | (2006.01) |
| *A47J 47/01* | (2006.01) |
| *G01F 11/18* | (2006.01) |
| *A47K 5/10* | (2006.01) |
| *A47G 19/34* | (2006.01) |

(52) U.S. Cl.
CPC ............ *A47J 47/01* (2013.01); *A47G 19/34* (2013.01); *A47K 5/10* (2013.01); *G01F 11/18* (2013.01)

(58) Field of Classification Search
CPC ...... G01F 11/18; G01F 15/005; G01F 15/001; G01F 13/001; G01F 11/00; A47K 5/10; A47J 47/01; A47G 19/34; A47G 19/24; B65D 83/06

USPC .......... 222/344, 354, 197, 336, 361
See application file for complete search history.

(56) References Cited

U.S. PATENT DOCUMENTS

| | | | |
|---|---|---|---|
| 1,471,621 | A | 2/1923 | Mccord |
| 1,455,970 | A | 5/1923 | Resek |
| 1,904,756 | A | 4/1933 | Wooster |
| 3,072,299 | A | 1/1963 | Neubauer |
| 3,185,190 | A | 5/1965 | Crawford |
| 3,193,159 | A | 7/1965 | Swindler |
| 5,421,491 | A | 6/1995 | Tuvim |
| 5,685,461 | A * | 11/1997 | Mitchell ............ G01F 11/18 222/184 |

(Continued)

*Primary Examiner* — Paul R Durand
*Assistant Examiner* — Robert Nichols, II
(74) *Attorney, Agent, or Firm* — Bold IP, PLLC; Daniel Cole; Maki Imakura (57) ABSTRACT

A hand operated device for storing, measuring, and dispensing powder or granular materials, with a simplified structure and reduced number of parts. The housing integrates a material storage container with a dispenser, comprising: special compartments and sound damper, made of elastic porous material that makes use of the device quiet; a one touch assembly and disassembly of an inner space of the device where the dispenser is located; structural elements for dispensing a predetermined volume of the material or its fraction, including a way to reduce the length of the working stroke of the dispensing mechanism; wall extensions to prevent bridges of sticky particles forming; separating walls to allow delivery a more than one material stored in one device including more than one material transporting mechanisms inside the dispenser; and structural elements providing exact measuring, and sifting or pouting of the materials.

3 Claims, 9 Drawing Sheets

(56) References Cited

U.S. PATENT DOCUMENTS

| | | | |
|---|---|---|---|
| 6,962,274 B1 | 11/2005 | Sherman | |
| 7,980,426 B2 * | 7/2011 | Vollmann | A61C 5/068 |
| | | | 222/145.1 |
| 2006/0091163 A1 * | 5/2006 | Peng | A47G 19/24 |
| | | | 222/361 |
| 2006/0255074 A1 * | 11/2006 | Amir | G01F 11/18 |
| | | | 222/361 |

* cited by examiner

DEVICE AND INDUSTRIAL PACKAGE FOR STORING, MEASURING AND DISPENSING POWDER AND GRANULAR SUBSTANCES

BACKGROUND

The present invention relates to a hand-operated device for storing, measuring and dispensing of powder and granular materials such as instant and ground coffee, baby formula, flour, spices, detergents and the like that can be used for household or industrial packaging. More particularly, it relates to storing, measuring and dispensing of the predetermined volume of powder or granular materials from a refillable container or from a container in which the material is industrially packed, sold and normally stored.

Various types of devices, combining storing, measuring and dispensing functions for powder and granular materials have been developed in the past, for example U.S. Pat. Nos. 1,455,970; 1,471,621; 1,904,756; 3,072,299; 3,185,190; 3,193,159; 5,421,491; 6,962,274; 6,962,274. Some of these devices are aimed for food products and housekeeping materials.

The above patents disclose substantially improved structures of hand operated dispensers for powder and granular materials. However, even these patented dispensers have some or all of the following drawbacks:

- Complexity of the structure, including too many parts which make the dispensers too expensive and impractical for use as a recycling package.
- Inability for easy assembly and disassembly of the device for cleaning which is a requirement for food products dispensers to maintain sanitary conditions.
- No options for delivery more then one material using one device or sifting of materials for precise delivery of spices, sugar, salt and the like materials according to individual taste of user.
- Limited use of dispensers with materials containing sticky particles, like baby formulas, flour and the like consisting of fine particles of the material, which can form bridges or blockages of material which causes irregular delivery.
- Loud/Noisy operation of the device which makes them unattractive for users trying to be discrete The main object of the present invention, as well as particular features, elements and advantages thereof, seek to solve the aforementioned problems with the prior art and it will be apparent from the following description and the accompanying drawing figures.

SUMMARY

The present invention is directed to a device that satisfies this need and achieves the above objects, among others. The device is directed to a hand operated device for storing, measuring and dispensing of powder or granular materials, with a simplified structure and reduced number of parts, having a solid housing integrating material storage container with stationery parts of a dispenser, comprising: special compartments and sound damper, made of elastic porous material that makes operation of the device quiet and more acceptable for users; a means for one touch assembly and disassembly of an inner space of the device where a dispenser is located; structural elements for dispensing a predetermined volume of the material or its fraction, including stopping means for reduction of length of working stroke of the dispensing mechanism; a means making the device reliable when it is used with materials including sticky particles; a means providing the device configured to delivery more then one material stored in one device, including more then one material transporting mechanisms inside the dispenser; and structural elements providing exact measuring, and sifting or pouring of the materials.

BRIEF DESCRIPTION OF DRAWINGS

These and other features, aspects and advantages of the present invention will become better understood with regard to the following description, appended claims, and accompanying drawings wherein:

DETAILED DESCRIPTION

Referring to the drawings in FIGS. 1-11 a device for storing, measuring and dispensing of powder and granular materials is described below in details and as shown in each preferred embodiment.

Figure 1A:
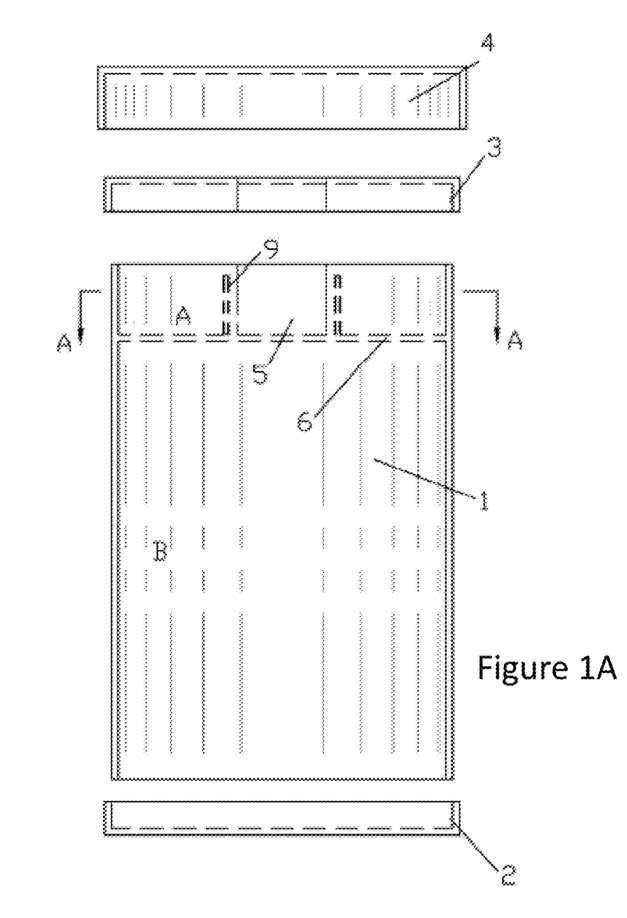
FIG. 1A shows a front view of the device.

The device embodied in FIGS. 1A-1C consists of the following main parts: housing 1 which may be embodied as approximately cylindrical or approximately parallelepiped shape with separating wall 6 separating housing 1 into two parts: the first part A is the space accommodating dispensing mechanism located above separating wall 6 and below top cover 3, and the second part B is a container for the materials located below separating wall 6 and above bottom cover 2. Material receiving opening 7 in separating wall 6 connects part B with part A. There is also opening 5 in part A allowing movement of a slide of the dispensing mechanism outside the housing when the device works. Cover 2 provides closing of space B at its open end after the device is loaded with the material; cover 3 provides closing of part A at its open end after the dispensing mechanism is installed; cap 4 close a discharging opening of the device when the device does not work.

Figures 1B, 1C:
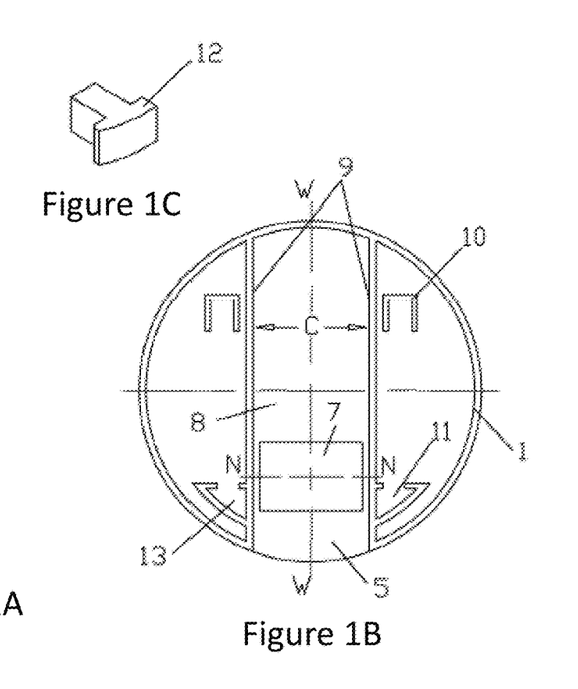
FIG. 1B shows a top view of a separating wall inside the housing along cross section A-A in FIG. 1A.
FIG. 1C shows an isometric view of a sound damper.

In FIG. 1B. the separating wall 6, including material receiving opening 7 through which the dispensing mechanism is fed by the material to be dispensed. Material receiving opening 7 is associated with volume of the material dispensed by the device in one working stroke of the dispensing mechanism 19 and with the dimensions of slide that is the main part of the dispensing mechanism. Aside from material receiving opening 7 separating wall 6 comprises two upstanding walls 9 forming passageway 8 configured to accommodate the dispensing mechanism. Width C of passageway 8 and its height provide free movement of slide of the dispensing mechanism (described later). Separating wall 6 further includes stopping means 10 and 11 made of wall structure, similar to upstanding walls 9 as shown in FIG. 1B, limiting movement of dispensing mechanism 19. Means 11 prevents the spring loaded dispensing mechanism 19 from popping out of housing 1.

In FIGS. 1A-1C and 11A-11C two example embodiments of the device in cylindrical and parallelepiped shape are shown.

Figure 2:
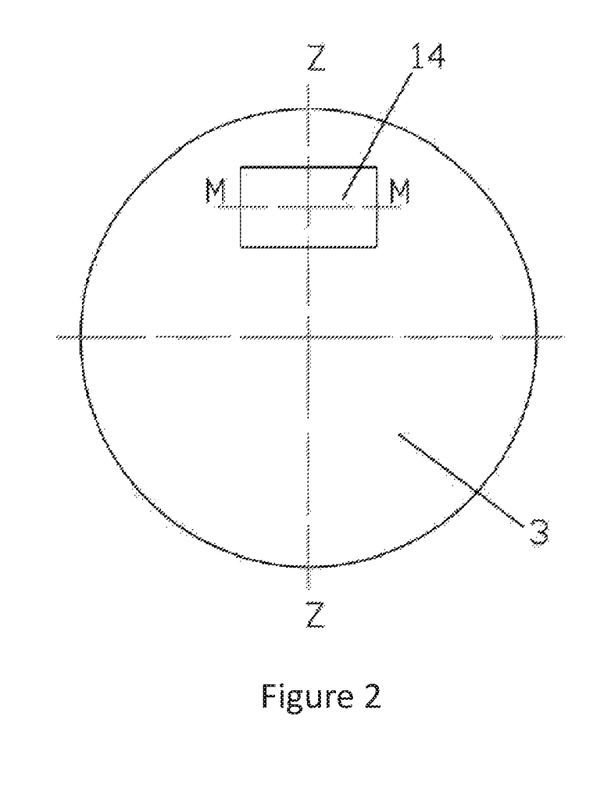
FIG. 2 shows a top view of a top cover of the device.

Cover 3 (FIG. 2) includes material discharging opening 14. Its dimensions are substantially equal to material receiving material receiving opening 7. Excises W-W (See FIG. 1B) of receiving material receiving opening 7 and Z-Z of material discharging opening 14 are coincident with longitudinal excise of passageway 8. The distance between excises N-N and M-M of the openings is equal to working stroke of the dispensing mechanism. The closing of housing 1 by covers 2 and 3 may be configured to make housing 1 airtight by adding a sealing means (rubber, silicon, caulking, gasket, etc.) around the periphery of moving and nonmoving parts.

Figure 3:
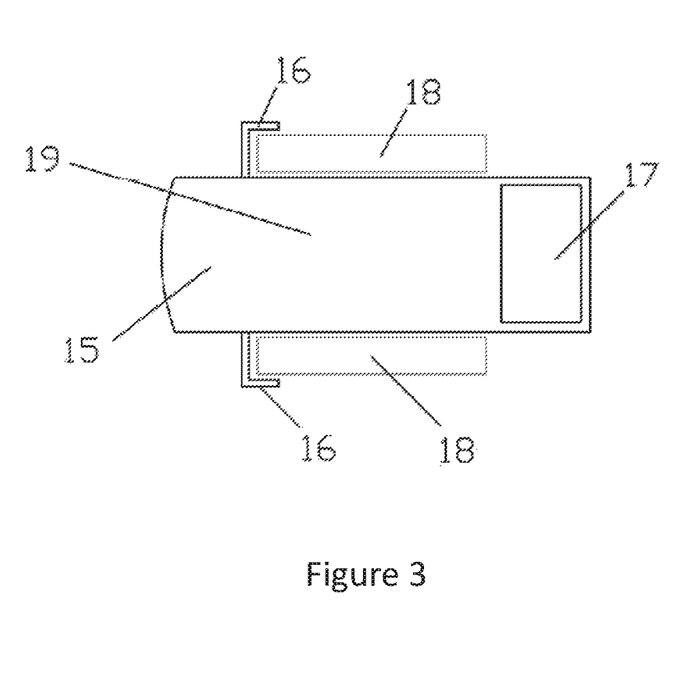
FIG. 3 is a top view of a dispensing mechanism.

Dispensing mechanism 19 is shown in FIG. 3. Its main function is delivery of the material from material receiving opening 7 to material discharging opening 14. Dispensing mechanism 19 consists of slide 15, spring supports 16, and at least one spring 18. Slide 15 is inserted into passageway 8 and is moveable back and forth along the passageway. Slide 15 includes opening 17 which, in combination with separating wall 6 and cover 3 defines a moveable compartment capable to receive a predetermined volume of the material delivered by the device in one stroke. Cross sectional sizes and shapes of opening 17 are substantially the same as of material receiving opening 7 in separating wall 6. The compartment is loaded with the material when the device is in up-side-down orientation. Location of the compartment along the slide provides registration of opening 17 and material receiving opening 7 when the slide is being loaded.

Slide 15 has idle and working positions. In idle position slide 15 is inserted completely inside housing 1 and springs 18 are compressed against stopping means 10 and spring support 16. Cap 4 retains the slide in this position. To switch slide 15 into working position, cap 4 is removed. Accordingly, springs 18 push the slide out of housing 1 until it is stopped by stopping means 11. As a result, every time when the slide is stopped it kicks stopping means 11 due to spring forces applied to slide 15. To prevent loud or noisy operation of the device caused by reacting of structure to spring force, stopping means 11 is equipped with one or more sound damper 12 (FIG. 1C) where an embodiment is made of elastic porous material, which reduces noise. The stopping means 11 includes chamber 13 where pad 12 is tightly inserted. The pad extends from the chamber toward springs 18, providing direct contact of pad 12 with slide 15 when the slide kicks said stopping means 11 damping the noise.

The method of assembly of the device is as follows:
Step 1—Place damper 12 in chamber 13;
Step 2—Place dispensing mechanism 19 with slide 15 pointed toward housing 1 inside space A of the housing through passageway 8;
Step 3—Close space A of the housing 1 by top cover 3 and turn the device up-side-down such that top cover 3 is now at the bottom;
Step 4—Fill space B with the material, close it with bottom cover 2 and turn the device into original position.
Step 5—Close the housing 1 with cap 4;
Then packed material is ready for further processing.

For dispensing the materials cap 4 should be removed which causes the slide 15 to pop out from the housing 1. Turn the device upside down over the vessel where the material has to be delivered and push the slide inside the housing. One volume of the substance will be dispensed immediately. For more substance, press the slide as many times as desired. When the dispensing is finished, turn the device in original position, push the slide 15 inside the housing 1 and put on cap 4.

After using the material the device should be filled once again with the material (for non-food product), cleaned for reuse (if food) or directed for recycling (industrial package).

Figure 11A:
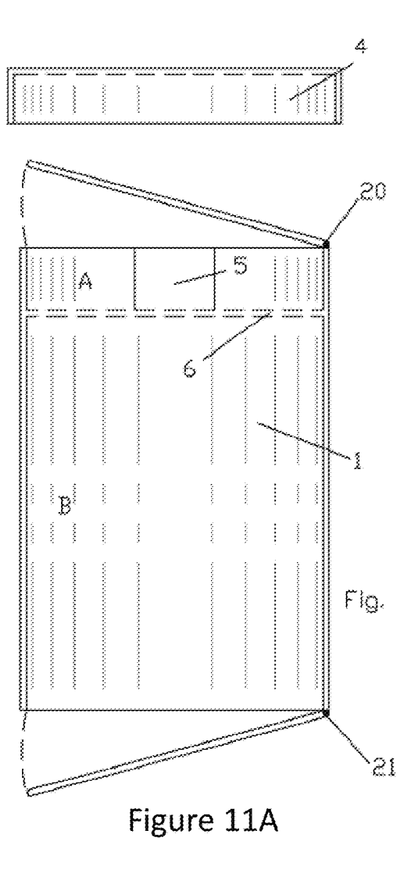
FIG. 11A shows a front view of another embodiment with parallelepiped shape of a housing.
Figure 11B:
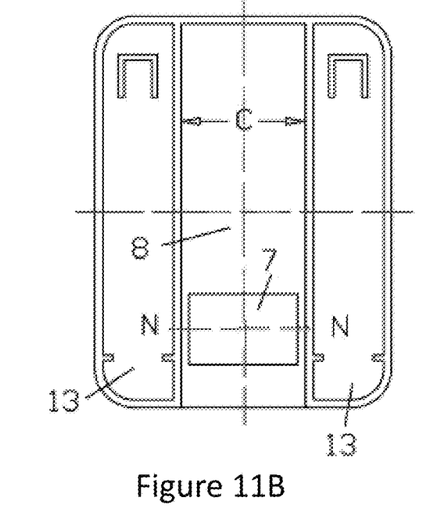
FIG. 11B shows a top view of a separating wall inside the housing of parallelepiped shape.
Figure 11C:
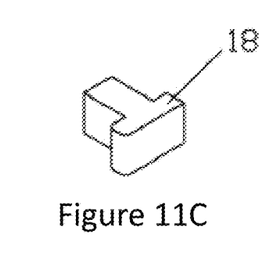
FIG. 11C shows an isometric view of a sound damper inside the housing of parallelepiped shape.

A version of the device with a parallelepiped shape adjusted for use as a recycling package is shown in FIG. 11. The difference in structure is integration of housing 1 with covers 2 and 3. The covers are molded together with housing 1 that is shown in FIG. 1. For connection of cover 2 with the housing, and cover 3 with the housing it is used hinge connections 20 and 21 configured for closing the top and bottom open ends of housing 1 simply by turning the covers about the housing. Both closures, if required, can be configured to be airtight which can be done in any way that is well known from existing practice in the art. When used as a recyclable industrial package, the material is never exposed to the open air after packaging, which effectively serves to prevent spoiling of quality products, for example, coffee. Other advantages of the parallelepiped device are: (It comprises reduced number of parts and decreases the production cost;) Space A (in FIG. 1) for the dispensing mechanism, and accordingly the whole device is smaller than a counterpart using a cylindrical shape; having less volume is easier to transport; overall reduction of production and operating cost. OK Another version of the invention is a device described above being convenient for cleaning and refilling. In this version structure of the device is adjusted for easy and fast assembly and disassembly of covers 2 and 3. For cover 2 it is achievable, for example, by using a threaded connection between cover 2 and housing 1, or by any other convenient structure. The device is refilled in up-side-down position.

Figure 4A:
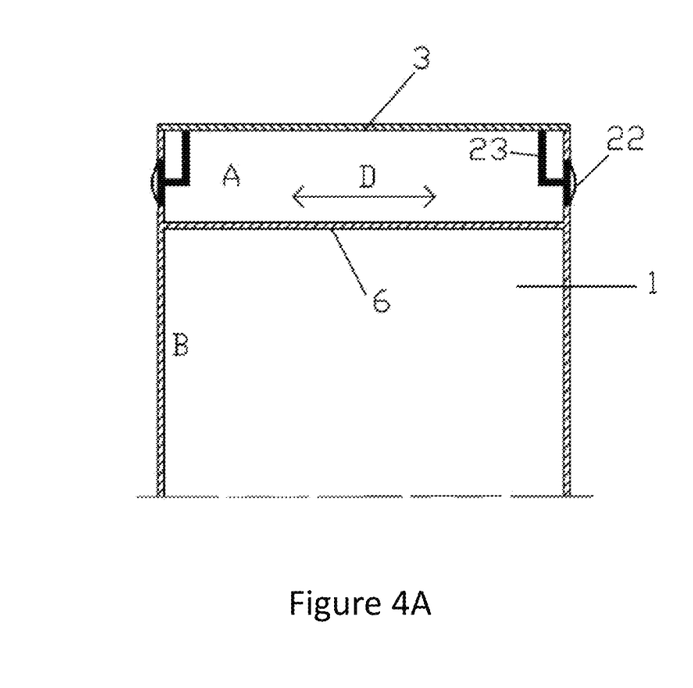
FIG. 4A is a cross sectional view of top part of a housing including connection between the housing and the top cover.
Figure 4B:
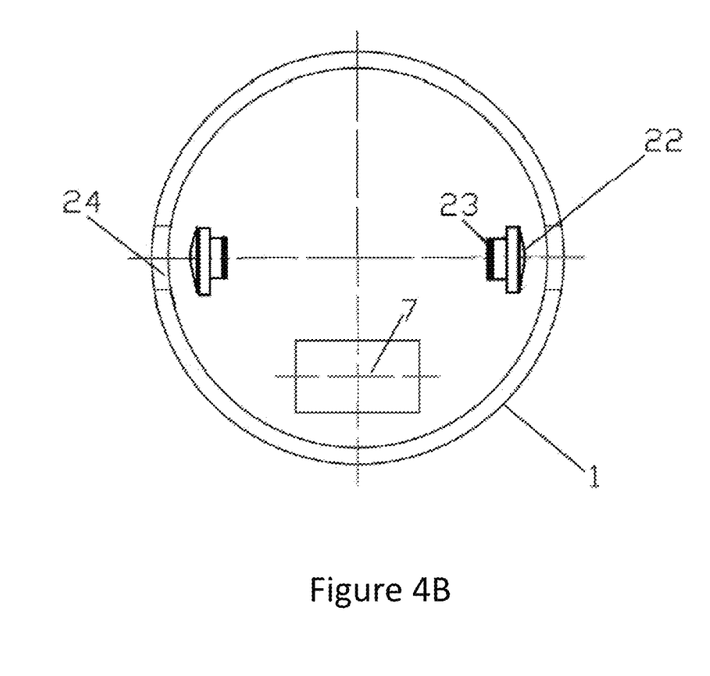
FIG. 4B is a cross sectional view of a wall of a housing, upstanding parts from separating wall are not shown.

After refilling it, the space should be closed by cover 2. Easy assembly or disassembly of the device is achieved by using a fastener, preferably a male-female clamp (FIGS. 4A and 4B) connecting cover 3 and housing 1. Two male knobs 22 are placed opposite to each other. They are connected to cover 3 by flat springs 23 providing lateral displacement of the knobs along arrow D when they are pressed inward as it is shown in FIG. 4B. Space A of housing 1 includes two female openings 24 configured to receive knobs 22. For air-sensitive materials the connection should be airtight. For assembly cover 3 should be pressed toward separating wall 6. Knobs 22 will enter the female openings 24 and lock the connection. To unlock the connection and disassemble of the device knobs 22 should be pressed inwardly and cover 3 pulled out of the housing 1. Assembly and disassembly of is made by one touch.

Figure 5A:
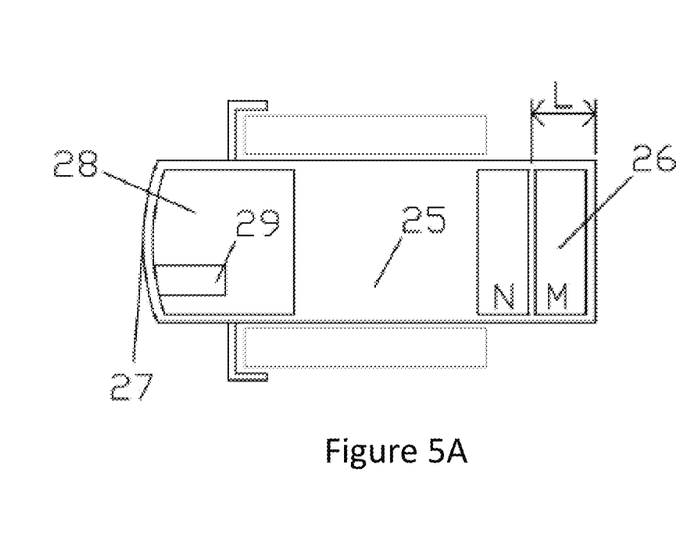
FIG. 5A is a top view of a slide for delivery of a predetermined volume of a material or its fraction.
Figure 5B:
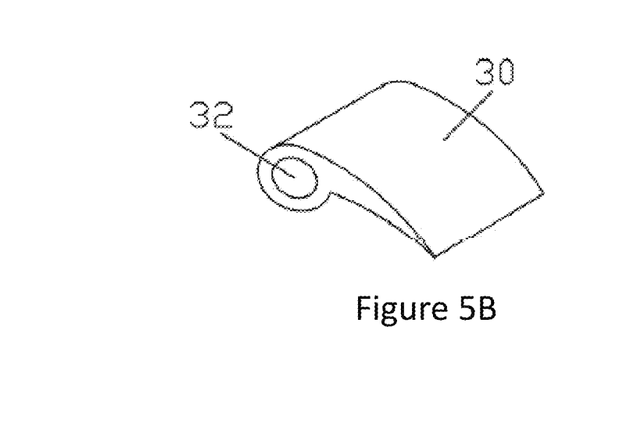
FIG. 5B shows an isometric view of a stopper reducing working stroke of the slide shown in FIG. 5A.

Still another version of the invention is a device capable to deliver a predetermined volume of the material or fraction thereof—one half as described below (FIGS. 5A, 5B, 5C, and 5D). The only difference in structure is in dispensing mechanism 19. As it is disclosed dispensing mechanism includes opening which defines an adjustable movable compartment capable to receive a predetermined volume of the material delivered by the device in one stroke. For delivery a half of this volume the opening includes inside wall 26 perpendicular to direction of movement of the side 25 (FIGS. 5A-5D). Wall 26 separates the opening into two spaces N and M, which are configured in this embodiment to have equal volume. At the slide end 27 there is pin 29 parallel to the direction of back and forth movement of the side. Slide 25 includes an operable stopper 30 which has a stopper hole 31 which receives pin 29 in order to mount to slide 25 on slide end 27. The diameter of stopper hole 32 is suitable for placing stopper 30 over the pin 31, and turning stopper 30 about pin 31. In this embodiment distance from the open end of the stopper in assembled position and the end 27 of the slide is equal to distance L shown in (FIG. 5A).

Figure 5C:
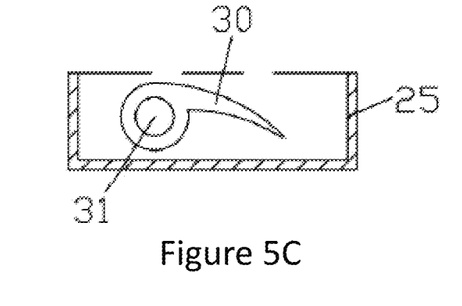
FIG. 5C shows position of the stopper inside the slide for delivery of a predetermined volume of a material.
Figure 5D:
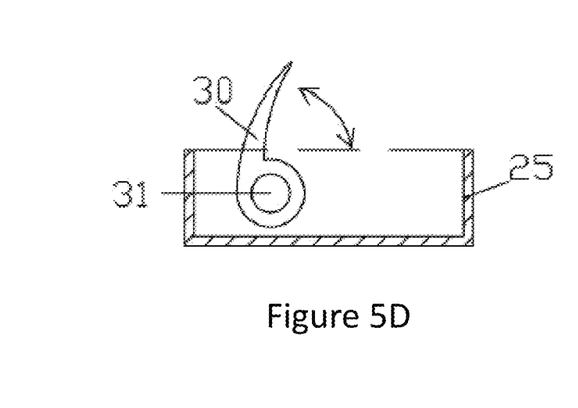
FIG. 5D shows the position of the stopper inside the slide for delivery of a fraction of predetermined volume of a material.

Stopper 30 has working and idle positions (FIGS. 5D and 5C respectively). The idle position stopper 30 is within the height of slide 25 as it is shown in FIG. 5C. By pushing, slide 25 goes completely into the housing 1. Whole opening for a predetermined volume of the material becomes registered with material discharging opening 14 and thereby the predetermined volume of dispensed material is delivered. For delivery a half of the volume stopper 30 should be turned almost vertically as shown in FIG. 5D. In this working position the slide 25 moves inside housing 1 only partially. Then housing 1 stops slide 25 and only space M of the opening becomes registered with material discharging opening 14. Accordingly, only one half of the predetermined volume of the material is delivered.

By adjustment of position of wall 26 in the slide and length of stopper 30 other fractions of predetermined volume of the materials can be dispensed.

Figure 6A:
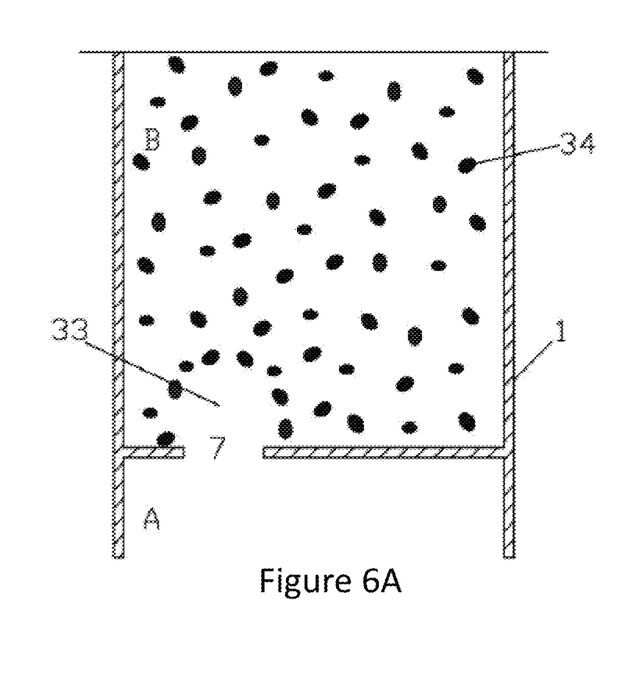
FIG. 6A is a fragmentary cross section showing material bridge over material receiving opening.
Figure 6B:
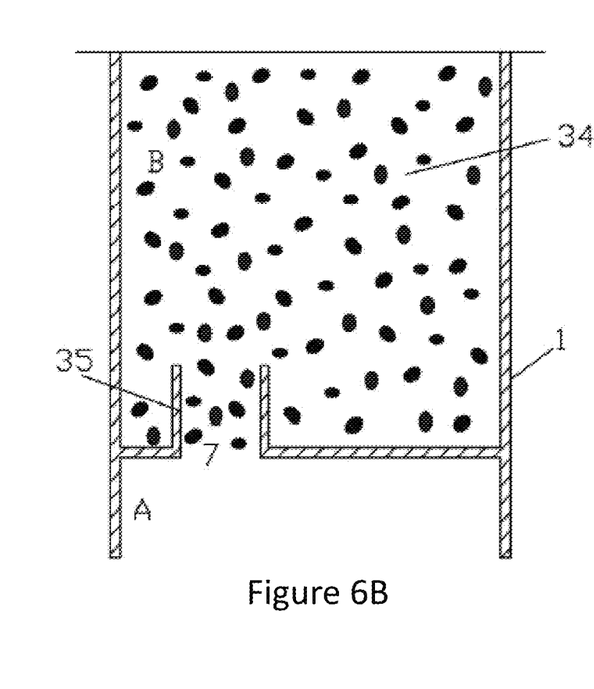
FIG. 6B is a fragmentary cross section showing an extended structure eliminating formation of bridge over material receiving opening.

Still another version of the invention is a device capable to dispense highly hydro-filled fine-particle materials like baby formula, flour, etc. Dispensing features of such materials is stickiness of their particles. The slide measures the materials in small amounts (tbsp, tsp, or even less) and sizes of the material receiving opening 7 are rather small, the particles tend to form a bridge 33 over the opening (FIG. 6A). Such bridges block the material from being dispensed from space B of housing 1 into opening 17 in the slide. The amount of the dispensed material becomes irregular. To prevent forming the bridge 33, separating wall 6 includes extension 35 toward space B, which surrounds material receiving opening 7 as it is shown in FIG. 6B. As it is shown, formation of a bridge is avoided.

Figure 7A:
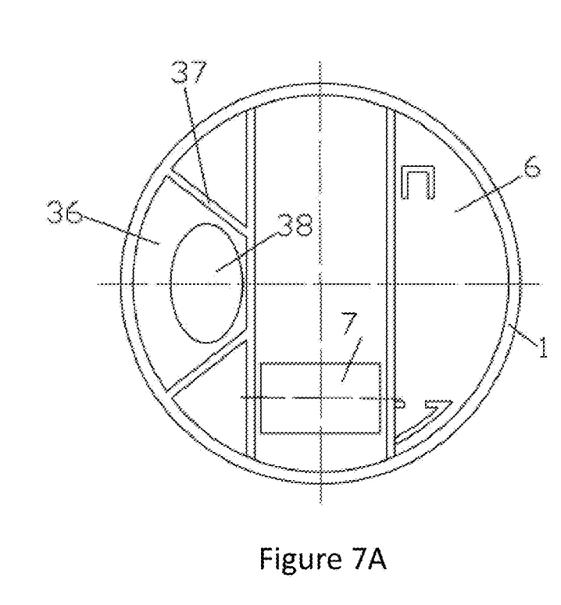
FIG. 7A shows a top view of a separation wall inside a housing with material compartment for sifting the material.
Figure 7B:
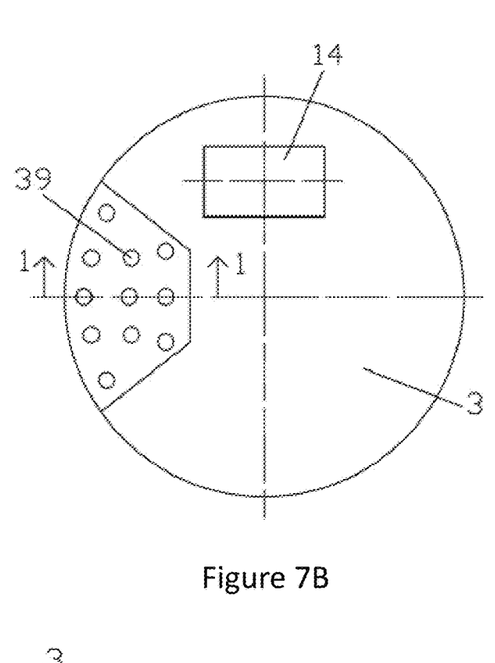
FIG. 7B shows a top view of the top cover of the device with apertures for sifting of the material.
Figure 7C:
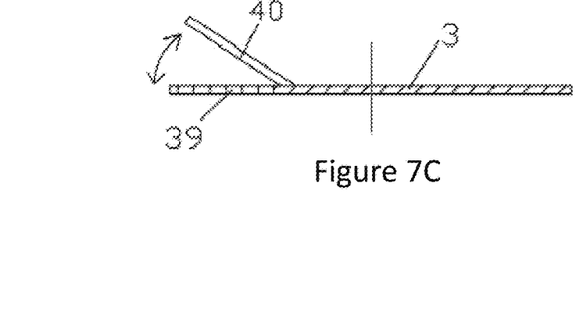
FIG. 7C shows a side view of the cover of the device with a closure for covering the apertures.

Some products like salt, sugar, ground pepper and the like should be added to food according to individual taste of the user. Overdosing spoils food and lack of these products makes food not tasty. Thus, a predetermined volume of the material cannot provide individual adjustment of delivery. The best solution of this problem is a device delivering a predetermined volume of the material that is close but slightly lower than the required dose, and then sift additionally required small amount of the product. Below it is disclosed a device providing such option. The only differences in structure compare with the first version are in separating wall 6 and cover 3. As it is shown in FIGS. 7A and 7B separating wall 6 additionally includes chamber 36 aside from passageway 8. The chamber 36 is formed by a combination of walls 37 and covers 3, and collects the material to be sifted. The chamber is connected with space B of housing 1 by sifter opening 38. Chamber 36 is being filled with the products when the device is in its sifting position and becomes empty when sifting is not performed and the device is in its idle position. Cover 3 in counter of compartment 36 includes alternatively small apertures 39 (FIG. 7B and section 1-1) convenient for sifting disparate material. Cover 3 includes also closure 40 covering apertures 39 (FIG. 7, section 1-1), preventing transfer of the products from chamber 36 when the predetermined volume of the product is being delivered, and allowing to discharge the products from the compartment when the product is being sifted.

Figure 8A:
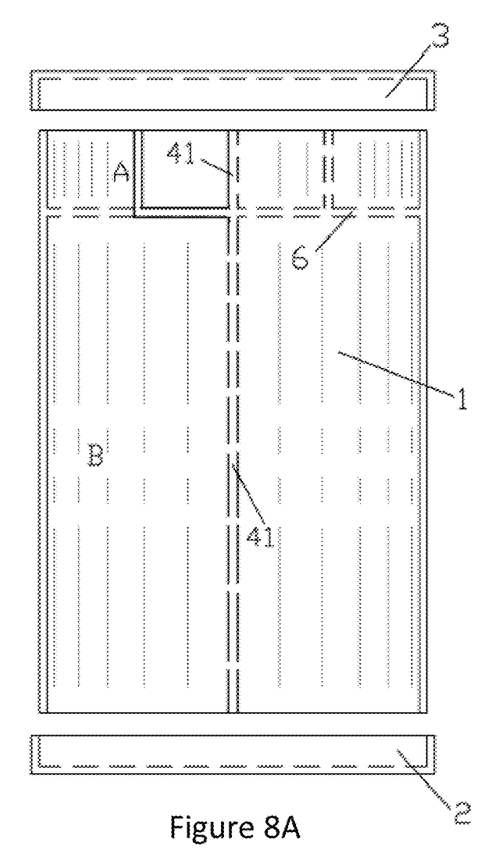
FIG. 8A shows front view of a device for delivery of predetermined volume of two materials stored in one device.
Figure 8B:
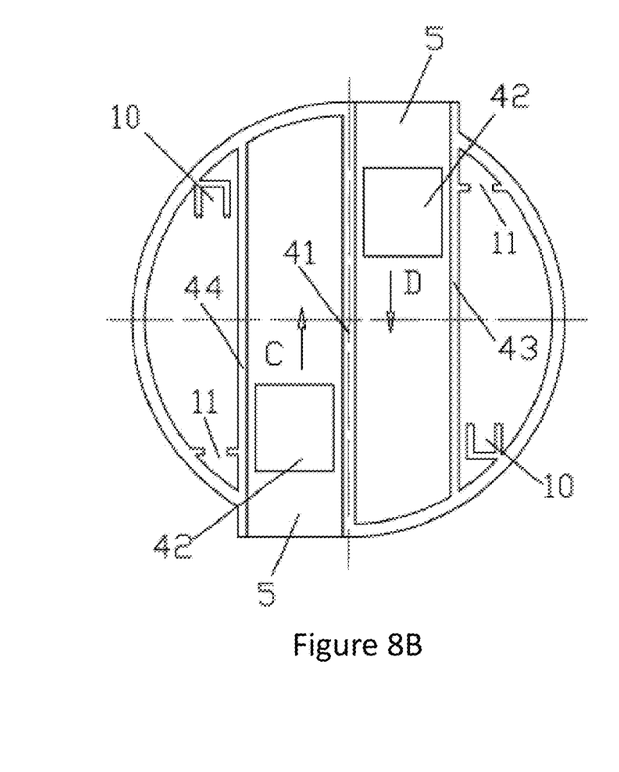
FIG. 8B is a top view of separating wall at the top of a housing of the device for delivery of predetermined volume of two materials stored in one device.

Another version of the present invention is a device capable to deliver a predetermined volume of two materials stored in one device is described below. This version makes the dispenser even more helpful. Housing 1 of tube-like shape includes vertical wall 41 separating housing 1 from its top to bottom, above and below separating wall 6, as it is shown in FIG. 8A. Space A accommodating two dispensing mechanisms includes two receiving openings 42 connecting space A with space B (FIG. 8B), where two different materials are stored, one opening for each material. Space A also includes two walls 43 and 44 upstanding from separating wall 6. Each of walls 43 and 44, together with wall 41 form two passageways for back and forth movement of two dispensing mechanisms, one dispensing mechanism for each material. There are also two openings 5 in space A allowing movement of slides of each dispensing mechanism outside the housing when the device is in operation. To facilitate the user's work with the device directions of movement of the dispensing mechanisms are on opposite sides, as it is shown in FIG. 8B by arrows C and D. Separating wall 6 further includes two pairs of stopping means 10 and 11, one pair for each dispensing mechanism. Stopping means 10 and 11 are not different from described for the first version.

Figure 9:
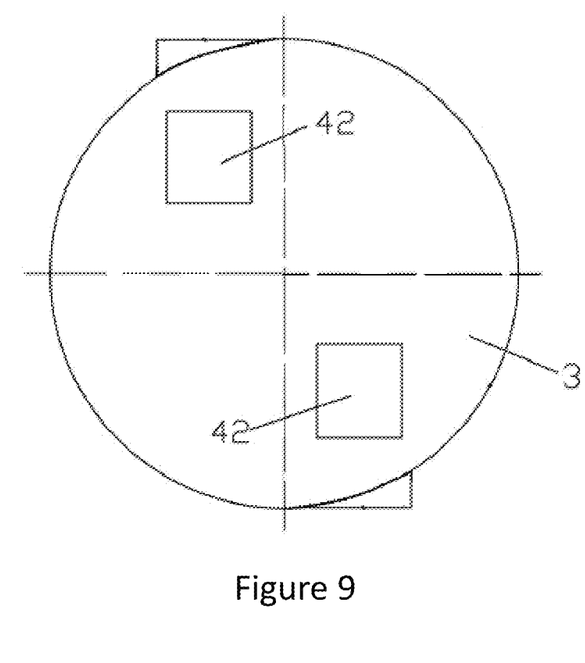
FIG. 9 shows a top view of top cover for delivery of predetermined volume of two materials stored in one device, upstanding parts from separating wall are not shown.

Cover 3 includes two material discharging openings 45 and 46, one for each material (FIG. 9). Positions of material receiving openings about the material discharging openings are as in first version.

Figure 10:
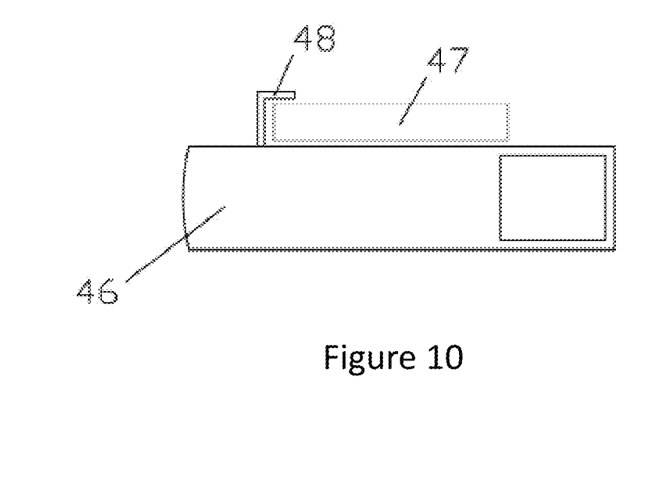
FIG. 10 shows a modified embodiment for delivery of predetermined volume of two materials stored in one device.

The only difference in dispensing mechanisms compare with the first version is that each slide can have only one spring 47 and spring support 48 (FIG. 10). As for assembly and operation of the above device, they are also the same as in the first version.

It will thus be seen that the objects set forth above are effectively attained and, since certain changes may be may be made in the above constructions without departing from the scope of the invention, it is intended that all matters contained in the above description or shown in the accompanying drawings shall be interpreted as illustrative only and not in a limiting sense.

It is also to be understood that the following claims are intended to cover all of the generic and specific features of the invention herein described and all statements of the scope of the invention that, as a matter of language, might be said to fall there between.

The invention claimed is:

1. A device for storing, measuring and dispensing powder or granular materials, comprising:
   a housing, which is a tube of substantially parallelepiped or cylindrical shape, having two opposite open ends;
   a dispensing mechanism, comprising a slide having at least one spring and at least one spring support;
   a separating wall, integrated with the tube wall as a monolithic part of the housing, perpendicular to the tube wall, separating the tube into two spaces: the first for storing the material to be dispensed, and the second for installation of the dispensing mechanism;
   said separating wall, having at least two substantially parallel walls enclosing the slide, an opening interconnecting the first and the second spaces, and at least one compartment to accommodate at least one sound damper,
   the at least one sound damper reducing noise resulted from stopping the slide inside the housing during operation of the device;
   two covers, closing the housing at its open ends, one of which at a slide associated end of the housing having an opening; and
   a removable cap at the slide associated end of the housing, preventing movement of the dispensing mechanism when the device is not in use.

2. A device according to claim 1, wherein each of the one or more sound dampers extend from the separating wall toward the springs of the dispensing mechanism, providing direct contact with the slide during its back and forth operation, thus reducing noise when the dispensing mechanism operates.

3. A device according to claim 1, including a removable connection between the housing and the cover at the slide associated end of the housing, providing access to dispensing mechanism for cleaning.

* * * * *